J. MERSCHDORF.
AUTOMOBILE LOCK.
APPLICATION FILED JAN. 21, 1916.
1,199,402.
Patented Sept. 26, 1916.
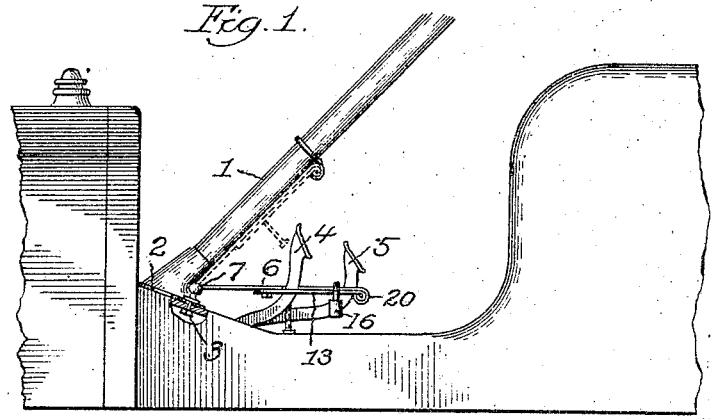
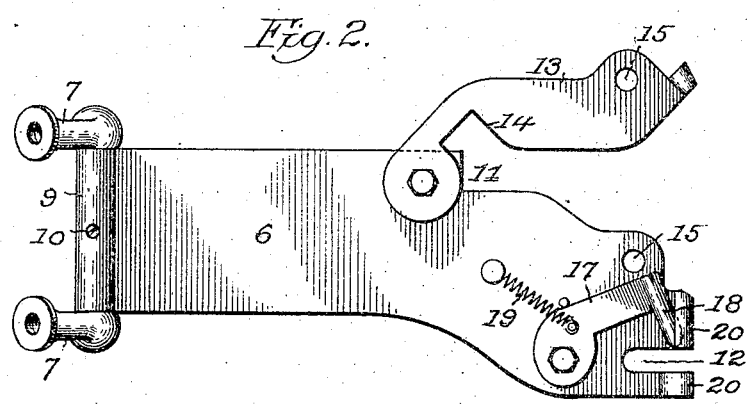
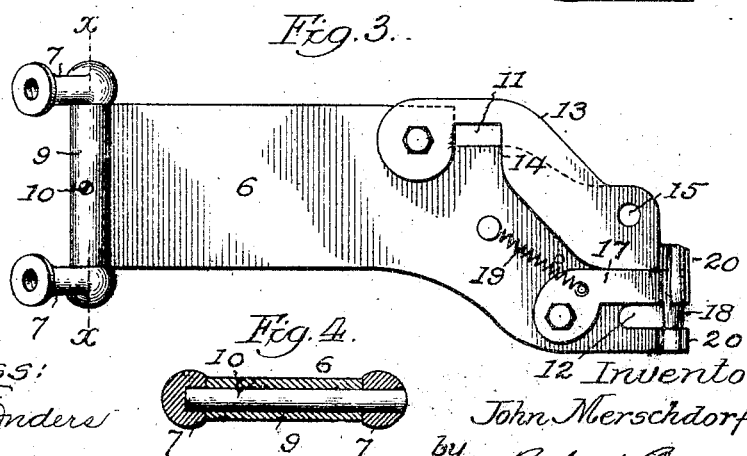
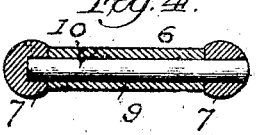
Witness:
John Enders
Inventor:
John Merschdorf,
by Robert Burns,
Atty.

UNITED STATES PATENT OFFICE.

JOHN MERSCHDORF, OF CHICAGO, ILLINOIS.

AUTOMOBILE-LOCK.

1,199,402.  Specification of Letters Patent.  Patented Sept. 26, 1916.

Application filed January 21, 1916. Serial No. 73,347.

*To all whom it may concern:*

Be it known that I, JOHN MERSCHDORF, a citizen of the United States of America, and a resident of Chicago, in the county of Cook, State of Illinois, have invented certain new and useful Improvements in Automobile-Locks, of which the following is a specification.

This invention relates to that type of locking mechanisms in which one or the other of the pedal levers controlling the operating mechanism of an automobile, is locked in an inoperative position of said operating mechanism. And the present improvement has for its object to provide means for effecting such locking function in a simple, convenient and effective manner, and with which dismemberment of said means when locked in place, is prevented, all as will hereinafter more fully appear.

In the accompanying drawings: Figure 1, is a side elevation illustrating the general association of parts of the present improvement. Fig. 2, is an inverted plan view of the present locking mechanism in an open condition of the parts. Fig. 3, is a similar view with the parts in a closed condition. Fig. 4 is a detail transverse section on line *x—x*, Fig. 3.

Similar reference numerals indicate like parts in the several views.

Referring to the drawings, 1 designates the usual steering post having a footing flange for attachment to the floor of an automobile by screw-bolts 3, as shown.

4 designates the foot lever or pedal by which the brake of the automobile is operated, and 5 designates the companion foot lever or pedal by which the clutch of the engine shaft and the primary speed portion of the speed changing mechanism of the automobile is operated, said levers or pedals in the Ford and other types of automobiles being arranged in adjacent relation to each other.

In the present improved construction, 6 designates a swinging plate hinged at one end in adjacent relation to the steering post 1 aforesaid, and preferably between a pair of pedestal nuts 7, screwing upon the screw-bolts 3 aforesaid. The upper ends of said nuts 7 are formed with transverse orifices for the reception of a pivot pintle 8, which is preferably inserted in place in an endwise direction, and is secured in place by a screw-stud 10 passing through the usual pivot knuckle 9 of the swinging plate 6.

11 and 12 designate a pair of open ended notches or receiving throats formed in the free end of the plate 6 aforesaid and adapted, as said plate 6 is swung down toward the floor of the automobile, to embrace the shanks of the foot levers or pedals 4 and 5 aforesaid.

13 designates a swinging latch piece pivoted on the under side of the plate 6 aforesaid, and provided with a lateral ear or extension 14 adapted to move over the outer open end of the throat 11 aforesaid, to secure the shank of the foot lever 4 against movement.

15 designate a pair of registering orifices formed in the latch piece 13 and plate 6, for the reception of the hasp of a padlock 16 to secure said parts against independent movement.

17 designates a secondary latch piece, also pivoted on the under side of the plate 6, and in lateral operative relation to the latch piece 13 aforesaid. The latch piece 17 is provided with a lateral locking tongue or pin 18 adapted to move over the outer open end of the throat 12 above described, to secure the shank of the foot lever 5 in position against movement. The relative arrangement of the latch pieces 13 and 17 is such that in a closing movement of the latch piece 13 by the operator, the companion latch piece 17 will be pushed into its latching position, in the final latching movement of the piece 13.

19 designates a spring tending to move the latch piece 17 into a normally open condition.

20 designate hook-shape sockets formed on the free end of plate 6 for holding engagement with the free ends of the latch plates 13 and 17 in their position closing the throats 11 and 12 aforesaid.

Having thus fully described my said invention what I claim as new and desire to secure by Letters Patent, is:—

1. An automobile foot lever lock comprising, a swinging plate having a pivot knuckle at one end and an open-ended receiving throat at its other end, a pair of pedestal nuts screwing upon the fastening bolts of the steering post of an automobile, the outer ends of said nuts having transverse pintle receiving orifices, a pintle arranged in the transverse orifices of said nuts and in the orifice of the pivot knuckle of the swinging plate, a latch piece pivoted to the swinging plate and provided with a lateral extension adapted to close the front end of the open throat aforesaid, means on the under side of the swinging plate for locking the pintle against lateral disengagement, and means for locking the swinging plate and latch piece together in a lever engaging position, substantially as set forth.

2. An automobile foot lever lock comprising, a swinging plate hinged adjacent to said lever and provided with a pair of open ended receiving throats at its free end, a pair of latch pieces pivoted to said plates and provided with lateral extensions adapted to close the front ends of the open throats aforesaid, the said plates having operative association so that a closing movement of one will effect a closing movement of the other, a spring tending to move one of said latch pieces into its open position, and means for locking said plate and one of said pieces in a lever engaging position, substantially as set forth.

3. An automobile foot lever lock comprising, a swinging plate hinged adjacent to said lever and provided with an open ended receiving throat and a hook shaped socket at its free end a latch piece pivoted to said plate and provided with a lateral extension adapted to close the front end of the open throat aforesaid, with the free end of said extension adapted to engage within said socket, and means for locking said plate and piece together in a lever engaging position, substantially as set forth.

Signed at Chicago, Illinois, this 18th day of January, 1916.

JOHN MERSCHDORF.